United States Patent
Hamada et al.

(10) Patent No.: US 12,164,440 B2
(45) Date of Patent: Dec. 10, 2024

(54) SECURE ARRAY ACCESS APPARATUS, SECURE ARRAY ACCESS METHOD, AND PROGRAM

(71) Applicant: NIPPON TELEGRAPH AND TELEPHONE CORPORATION, Tokyo (JP)

(72) Inventors: Koki Hamada, Musashino (JP); Atsunori Ichikawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 441 days.

(21) Appl. No.: 17/414,318

(22) PCT Filed: Jan. 9, 2020

(86) PCT No.: PCT/JP2020/000432
§ 371 (c)(1),
(2) Date: Jun. 16, 2021

(87) PCT Pub. No.: WO2020/145340
PCT Pub. Date: Jul. 16, 2020

(65) Prior Publication Data
US 2022/0114110 A1    Apr. 14, 2022

(30) Foreign Application Priority Data

Jan. 10, 2019    (JP) .................................. 2019-002450

(51) Int. Cl.
*G06F 12/14*    (2006.01)
*G06F 21/62*    (2013.01)

(52) U.S. Cl.
CPC ...... *G06F 12/1408* (2013.01); *G06F 21/6227* (2013.01)

(58) Field of Classification Search
CPC ............. G06F 12/1408; G06F 21/6227; G06F 12/1441; G06F 2212/1052; H04L 9/088; H04L 2209/16; H04L 2209/46
See application file for complete search history.

(56) References Cited

U.S. PATENT DOCUMENTS

| | | | |
|---|---|---|---|
| 7,350,085 B2 * | 3/2008 | Johnson | G06F 12/1408 711/216 |
| 2008/0152142 A1 * | 6/2008 | Buer | G06F 21/79 708/250 |

(Continued)

OTHER PUBLICATIONS

Patel S, Persiano G, Raykova M, Yeo K. PanORAMa: Oblivious RAM with logarithmic overhead. In2018 IEEE 59th Annual Symposium on Foundations of Computer Science (FOCS) Oct. 7, 2018 (pp. 871-882). IEEE. (Year: 2018).*

(Continued)

*Primary Examiner* — Shin-Hon (Eric) Chen
*Assistant Examiner* — Ethan V Vo
(74) *Attorney, Agent, or Firm* — XSENSUS LLP

(57) ABSTRACT

Access to an array is efficiently performed without reveling an accessed position. A storage 10 stores an array of concealed values $[x'^{\rightarrow}]$ of an array $x'^{\rightarrow}$ and an array of addresses $a'^{\rightarrow}$ corresponding to respective elements of the array of concealed values $[x'^{\rightarrow}]$. A refresh unit 11 determines a concealed value $[F]$ of a random parameter F, an array of concealed values $[x^{\rightarrow}]$ of an array $x^{\rightarrow}$ generated by permutating the array $x'^{\rightarrow}$ with random permutation ρ, and an array of public tags $b^{\rightarrow}$ calculated from respective elements of the array of addresses $a^{\rightarrow}$ with the function $Tag_F$. An access unit 12 performs a desired access to an element of the array of concealed values $[x^{\rightarrow}]$ corresponding to a tag that is calculated from a concealed value $[j]$ of an access position j with the function Tag and the concealed value $[F]$ of the parameter.

10 Claims, 7 Drawing Sheets

(56) References Cited

U.S. PATENT DOCUMENTS

| | | | | |
|---|---|---|---|---|
| 2010/0106920 | A1* | 4/2010 | Anckaert | G06F 12/1408 |
| | | | | 711/E12.001 |
| 2014/0007250 | A1* | 1/2014 | Stefanov | G06F 21/6254 |
| | | | | 726/26 |
| 2015/0089574 | A1* | 3/2015 | Mattsson | G06F 21/6245 |
| | | | | 726/1 |
| 2016/0328540 | A1* | 11/2016 | Hoogerbrugge | G06F 21/602 |
| 2016/0328543 | A1* | 11/2016 | Hoogerbrugge | H04L 9/3066 |
| 2017/0098089 | A1* | 4/2017 | Stewart | G06F 21/602 |
| 2019/0377884 | A1* | 12/2019 | Mandal | G06F 21/60 |

OTHER PUBLICATIONS

Liu C, Hicks M, Shi E. Memory trace oblivious program execution. In 2013 IEEE 26th Computer Security Foundations Symposium Jun. 26, 2013 (pp. 51-65). IEEE. (Year: 2013).*

Chakraborti A, Sion R. Sqoram: Read-optimized sequential write-only oblivious RAM. arXiv preprint arXiv:1707.01211. Jul. 5, 2017. (Year: 2017).*

Extended European search report issued on Sep. 6, 2022, in corresponding European patent Application No. 20737872.0, 9 pages.

English Translation of Hamada et al., "A Sublinear-Local-Computations Constant-Rounds Array Access Algorithm for Secure Multi-party Computation", Preprints of the 2019 Symposium on Cryptography and Information Security, Jan. 16, 2019, pp. 1-6, (already of record).

International Search Report and Written Opinion mailed on Mar. 31, 2020, received for PCT Application PCT/JP2020/000432, Filed on Jan. 9, 2020, 10 pages including English Translation.

Hamada et al., "A Sublinear-Local-Computations Constant-Rounds Array Access Algorithm for Secure Multi-party Computation" Preprints of the 2019 Symposium on Cryptography and Information Security, Jan. 16, 2019, pp. 1-6.

Chida et al., "A Three-Party Secure Function Evaluation with Lightweight Verifiability Revisited", CSS, 2010, 13 pages including English Translation.

Goldreich et al., "Software Protection and Simulation on Oblivious RAMs" Journal of the ACM, vol. 43, No. 3, May 1996, pp. 431-473.

Zahur et al., "Revisiting Square-Root ORAM: Efficient Random Access in Multi-Party Computation." In IEEE Symposium on Security and Privacy, May 22-26, 2016, pp. 218-234.

* cited by examiner

SECURE ARRAY ACCESS APPARATUS, SECURE ARRAY ACCESS METHOD, AND PROGRAM

CROSS-REFERENCE TO RELATED APPLICATIONS

The present application is based on PCT filing PCT/JP2020/000432, filed Jan. 9, 2020, which claims priority to JP 2019-002450, filed Jan. 10, 2019, the entire contents of each are incorporated herein by reference.

TECHNICAL FIELD

The present invention relates to cryptography application techniques, and in particular to techniques for reading and writing data from/to an array without revealing an accessed position.

BACKGROUND ART

Methods for obtaining a certain computation result without reconstructing encrypted numerical values include a method called secure computation (see Non-Patent Literature 1, for example). A method described in Non-Patent Literature 1 performs encryption so as to distribute numerical value fragments across three secure computation apparatuses and the three secure computation apparatuses perform cooperative computations so that results of addition-and-subtraction, constant addition, multiplication, constant multiplication, logical operations (NOT, AND, OR, XOR), and data format conversion (integer, binary) can be kept in a state of being distributed among the three secure computation apparatuses, that is, an encrypted state, without reconstructing numerical values.

When the j-th data in an array is read out or a value w is written without revealing an accessed position j, a common practice is to make it appear as if a random element is accessed every time the array is accessed (see Non-Patent Literatures 2 and 3, for example).

PRIOR ART LITERATURE

Non-Patent Literature

Non-Patent Literature 1: Koji Chida, Koki Hamada, Dai Ikarashi, Katsumi Takahashi, "A Three-party Secure Function Evaluation with Lightweight Verifiability Revisited", CSS, 2010

Non-Patent Literature 2: Oded Goldreich and Rafail Ostrovsky, "Software protection and simulation on oblivious rams." J. ACM, Vol. 43, No. 3, pp. 431-473, 1996.

Non-Patent Literature 3: Samee Zahur, Xiao Shaun Wang, Mariana Raykova, Adria Gasc'on, Jack Doerner, David Evans, and Jonathan Katz, "Revisiting square-root ORAM: efficient random access in multi-party computation." In IEEE Symposium on Security and Privacy, SP 2016, pp. 218-234, May 22-26, 2016.

SUMMARY OF THE INVENTION

Problems to be Solved by the Invention

The conventional technique, however, requires a $\Omega(\log n)$ number of communication stages for accessing an array of size n. Thus, there has been a challenge of an increased time required to access an array in an environment with large communication delay.

An object of the present invention is to provide secure array access techniques that enable efficient reading and writing of data from/to an array with a constant number of communication stages and without revealing an accessed position.

Means to Solve the Problems

To attain the object, a secure array access apparatus according to an aspect of the present invention includes: a storage that stores an array of concealed values $[x'^{\rightarrow}]$ of an array $x'^{\rightarrow}$ and an array of addresses $a^{\rightarrow}$ corresponding to respective elements of the array of concealed values $[x'^{\rightarrow}]$; a refresh unit that determines a concealed value $[F]$ of a parameter F, an array of concealed values $[x^{\rightarrow}]$ of an array $x^{\rightarrow}$, and an array of public tags $b^{\rightarrow}$, where $\rho$ is random permutation, the array $x^{\rightarrow}$ is an array generated by permutating the array $x'^{\rightarrow}$ with the permutation $\rho$, $a^{\rightarrow}$ is an array of addresses generated by permutating the array of addresses $a'^{\rightarrow}$ with the permutation $\rho$, $\text{Tag}_{F'}$ is a function representing injection from an address to a tag with F' being a parameter, the parameter F is a random parameter, and the array $b^{\rightarrow}$ is an array of public tags calculated from respective elements of the array of addresses $a^{\rightarrow}$ with the function $\text{Tag}_F$; and an access unit that performs a desired access to an element of the array of concealed values $[x^{\rightarrow}]$ corresponding to a tag that is calculated from an input concealed value $[j]$ of an access position j with the function Tag and the concealed value $[F]$ of the parameter.

Effects of the Invention

The secure array access techniques of the present invention enable efficient reading and writing of data from/to an array with a constant number of communication stages and without revealing an accessed position.

DETAILED DESCRIPTION OF THE EMBODIMENTS

Figure 1:
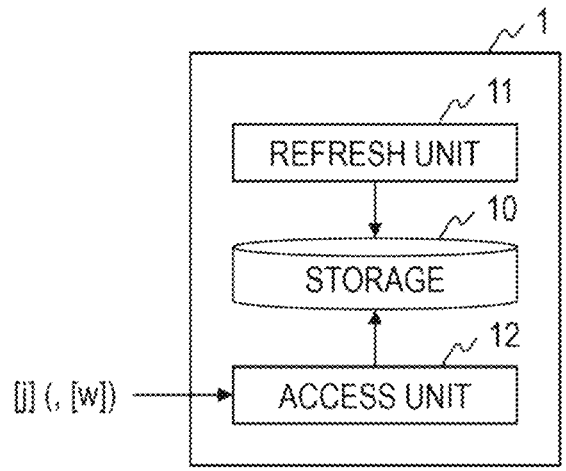
FIG. 1 is a diagram illustrating a functional configuration of a secure array access apparatus according to a first embodiment.

Prior to the description of embodiments of the present invention, notation and definition of terms in this specification are described.

<Notation>

A symbol (a superscript arrow) used in the text is supposed to be indicated right above the immediately preceding letter, but it is indicated immediately after the letter due to limitation in text notation. In formulae, these symbols are indicated at their proper positions, namely right above the letter. For example, in formulae, "a$^\rightarrow$" is represented as the formula below.

$$\vec{a}$$

A value generated by concealing of a certain value a via encryption, secret sharing, or the like is called a concealed value of a and denoted as [a]. Also, a is called a plaintext of [a]. When concealing is secret sharing, a set of secret sharing fragments that are possessed by each secure computation apparatus is referenced by [a]. The i-th element of a vector $\vec{a}$=(a$^\rightarrow$[0], a$^\rightarrow$[1], ...) is referenced by a$^\rightarrow$[i], A vector b$^\rightarrow$ for which a vector a$^\rightarrow$=(b$^\rightarrow$[π(1)], b$^\rightarrow$[π(2)], ..., b$^\rightarrow$[π(n)]) holds with respect to a vector a$^\rightarrow$=(a$^\rightarrow$[1], a$^\rightarrow$[2], ..., a$^\rightarrow$[n]) and to a bijection π: [1, n]→[1, n] is denoted as b$^\rightarrow$=πa$^\rightarrow$. The number of elements in the vector a$^\rightarrow$ is denoted as |a$^\rightarrow$|.

<Reconstruction>

A process that takes the concealed value [a] of a as input and calculates a value c such that c=a holds is described by the formula below.

$$c \leftarrow \text{Open}([a])$$

<Arithmetic Operations>

Addition, subtraction, and multiplication operations take concealed values [a], [b] of two values a, b as input and calculate concealed values $[c_1]$, $[c_2]$, $[c_3]$ of calculation results $c_1$, $c_2$, $c_3$ of a+b, a−b, and ab, respectively. Executions of these operations are described as the formulae below, respectively.

$$[c_1] \leftarrow \text{Add}([a],[b]),$$

$$[c_2] \leftarrow \text{Sub}([a],[b]),$$

$$[c_3] \leftarrow \text{Mul}([a],[b])$$

When there is no possibility of misunderstanding, Add([a], [b]), Sub([a], [b]), and Mul([a], [b]) are abbreviated as [a]+[b], [a]−[b], and [a]×[b], respectively.

<Determination of Equality>

An operation for determination of equality takes the concealed values [a], [b] of the two values a, b as input and calculates a concealed value [c] of a boolean value c∈{0, 1} for a=b. The boolean value takes 1 when it is true and 0 when it is false. Execution of this operation is described as the formula below.

$$[c] \leftarrow EQ([a],[b])$$

<Selection>

An operation for selection takes the concealed value [c] of the boolean value c∈{0, 1} and the concealed values [a], [b] of the two values a, b as input, and calculates a concealed value [d] of d that satisfies the formula below.

$$d = \begin{cases} a & \text{if } c = 1, \\ b & \text{otherwise} \end{cases}$$

Execution of this operation is described as the formula below.

$$[d] \leftarrow \text{IfElse}([c],[a],[b])$$

This operation can be achieved with the formula below.

$$[d] \leftarrow [c] \times ([a]-[b])+[b]$$

<Application of Permutation>

A process that takes a sequence of n concealed values [a$^\rightarrow$]=([a$^\rightarrow$[1]], [a$^\rightarrow$[2]], ..., [a$^\rightarrow$[n]]) and a concealed value [π] representing a bijection π: {1, 2, ..., n}→{1, 2, ..., n} as input and calculates a concealed value such that b$^\rightarrow$=πa$^\rightarrow$ holds is described by the formula below.

$$[b] \leftarrow \text{Apply}([\pi],[\vec{a}])$$

<Inverse Permutation>

A process that takes the concealed value [π] representing the bijection π: {1, 2, ..., n}→{1, 2, ..., n} as input and calculates a concealed value [a]representing a bijection with σ=π$^{-1}$ is described by the formula below.

$$[\sigma] \leftarrow \text{Inv}([\pi])$$

<Composition of Permutations>

A process that takes the concealed value [π] representing the bijection π: {1, 2, n}→ {1, 2, ..., n} and a concealed value [ρ] representing a bijection ρ: {1, 2, ..., n}→{1, 2, ..., n} as input and calculates a concealed value [σ] representing a bijection with σ=ρ◯π is described by the formula below. Here, ◯ is an operator representing composition of mappings.

$$[\sigma] \leftarrow \text{Compose}([\rho],[\pi])$$

Embodiments of the present invention are now described in detail. In the drawings, components with the same functions are given the same reference numerals and overlapping descriptions are omitted.

First Embodiment

Figure 2:
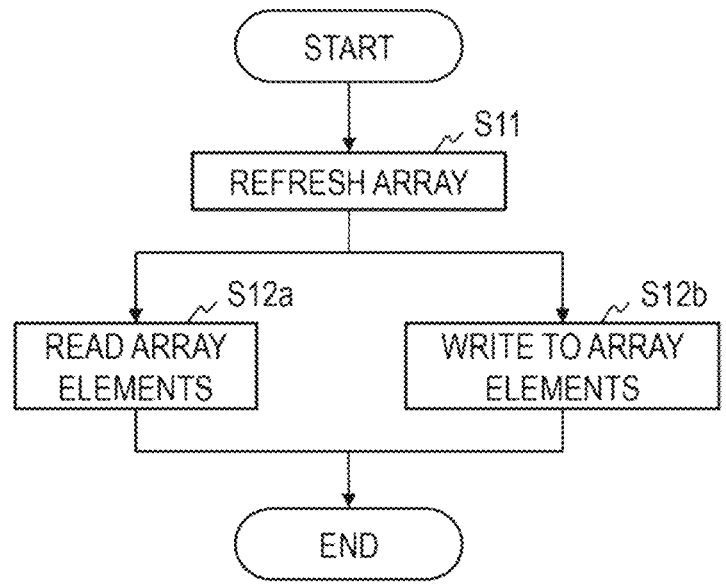
FIG. 2 is a diagram illustrating a processing procedure of the secure array access method according to the first embodiment.

When reading from an array, a secure array access apparatus 1 according to a first embodiment takes a concealed value [j] representing an access position as input, and outputs elements of an array corresponding to the access position. When writing to an array, the secure array access apparatus 1 takes the concealed value [j] representing the access position and a concealed value [w] of a value to be written as input, and updates the elements of the array corresponding to the access position with the value to be written. The secure array access apparatus 1 includes a storage 10, a refresh unit 11, and an access unit 12 as illustrated in FIG. 1. By the secure array access apparatus 1 performing processing at each of the steps illustrated in FIG. 2, a secure array access method in the first embodiment is implemented.

The secure array access apparatus 1 is a special device structured by loading of a special program into a well-known or dedicated computer having a central processing unit (CPU), a main storage unit (random access memory: RAM), and the like, for example. The secure array access apparatus 1 executes processing under the control of the central processing unit, for example. Data input to the secure array access apparatus 1 and/or data resulting from processing are stored in the main storage unit, for example, and the data stored in the main storage unit is read into the central processing unit as necessary to be used for other processing. The processing units of the secure array access apparatus 1 may at least partially consist of hardware such as integrated circuitry. The storages provided in the secure array access apparatus 1 can be composed of a main storage unit such as random access memory (RAM), an auxiliary storage unit formed from a hard disk or an optical disk or a semiconductor memory element such as flash memory, or middleware such as a relational database and a key value store, for example.

The storage 10 stores an array of n concealed values $[x'^{\rightarrow}]=([x'^{\rightarrow}[1]], [x'^{\rightarrow}[2]], \ldots, [x'^{\rightarrow}[n]])$ and an array of addresses $a'^{\rightarrow}=(a'^{\rightarrow}[1], a'^{\rightarrow}[2], \ldots, a'^{\rightarrow}[n])$ corresponding to the respective elements of the array of concealed values $[x'^{\rightarrow}]$. Here, n is a predetermined natural number. The elements of $a'^{\rightarrow}$ are assumed to be different from each other.

Figure 3:
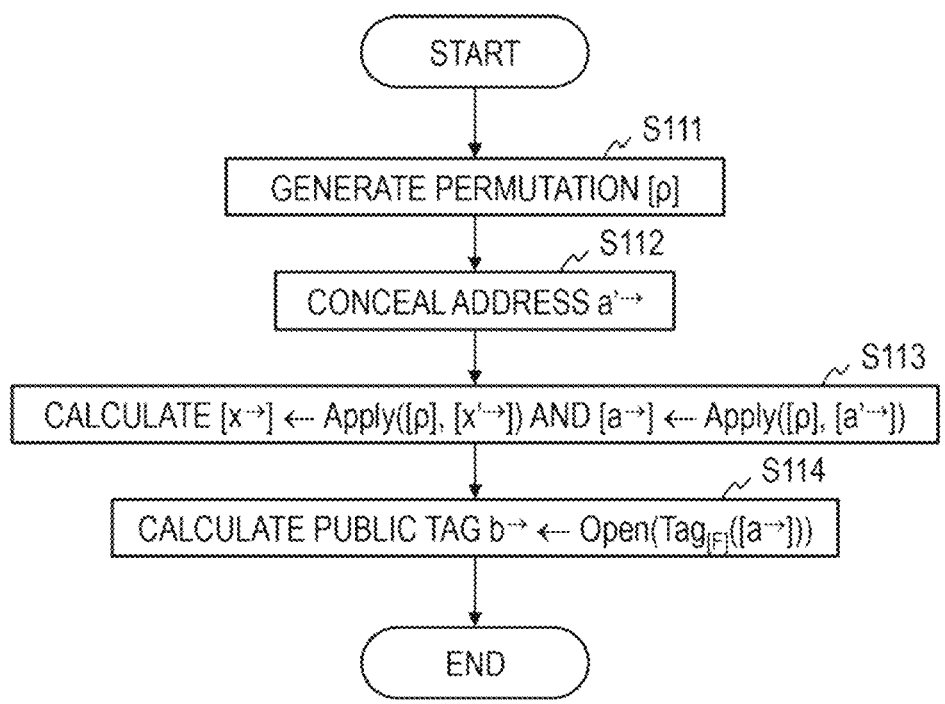
FIG. 3 is a diagram illustrating a processing procedure in the secure array access method that is performed at the time of refreshing.

In step S11, the refresh unit 11 uses the array of concealed values $[x'^{\rightarrow}]$ and the array of addresses $a'^{\rightarrow}$ stored in the storage 10 to generate concealed values $[x^{\rightarrow}]=([x^{\rightarrow}[1]], [x^{\rightarrow}[2]], \ldots, [x^{\rightarrow}[n]])$ of an array $x^{\rightarrow}=(x^{\rightarrow}[1], x^{\rightarrow}[2], \ldots, x^{\rightarrow}[n])$ which is generated by permutating a plaintext $x'^{\rightarrow}$ of the array of concealed values $[x'^{\rightarrow}]$, and an array of public tags $b^{\rightarrow}=(b^{\rightarrow}[1], b^{\rightarrow}[2], \ldots, b^{\rightarrow}[n])$ that correspond in one-to-one to the respective elements of a permuted array of addresses $a^{\rightarrow}$, where an array of addresses corresponding to the respective elements of the permuted array of concealed values $[x^{\rightarrow}]$ is $a^{\rightarrow}=(a^{\rightarrow}[1], a^{\rightarrow}[2], \ldots, a^{\rightarrow}[n])$. In the following, operations of the refresh unit 11 are described in more detail with reference to FIG. 3.

In step S111, the refresh unit 11 generates a concealed value $[\rho]$ that represents a random permutation $\rho$.

In step S112, the refresh unit 11 conceals the respective elements of the array of addresses $a'^{\rightarrow}$ stored in the storage 10 to obtain an array of concealed values of addresses $[a'^{\rightarrow}]$.

In step S113, the refresh unit 11 applies the permutation $[\rho]$ to the array of concealed values $[x'^{\rightarrow}]$ stored in the storage 10 to obtain a permuted array of concealed values $[x^{\rightarrow}]$. That is, the refresh unit 11 calculates Formula (1).

$$[\vec{x}] \leftarrow \text{Apply}([\rho],[\vec{x}']) \qquad (1)$$

The refresh unit 11 also applies the permutation $[\rho]$ to the array of concealed values of addresses $[a'^{\rightarrow}]$ to obtain a permuted array of concealed values of addresses $[a^{\rightarrow}]$. That is, the refresh unit 11 calculates Formula (2).

$$[\vec{a}] \leftarrow \text{Apply}([\rho],[\vec{a}']) \qquad (2)$$

In step S114, the refresh unit 11 calculates a function $\text{Tag}_{[F]}([a^{\rightarrow}])$ for the permuted array of concealed values of addresses $[a^{\rightarrow}]$ using a concealed value $[F]$ representing a random parameter F, and reconstructs the calculation result to obtain an array of public tags $b^{\rightarrow}=(b^{\rightarrow}[1], b^{\rightarrow}[2], \ldots, b^{\rightarrow}[n])$. Here, the function Tag[F] is a function representing injection from an address to a tag and its operation is controlled by the parameter [F], It is assumed that when an input is a concealed value, the function $\text{Tag}_{[F]}$ executes each operation in the function while keeping the input value concealed. It is also assumed that when an input is an array, the function $\text{Tag}_{[F]}$ calculates each operation in the function for each of the elements of the array. That is, the refresh unit 11 calculates Formula (3) for each integer i from 1 to n inclusive.

$$\vec{b}[i] \leftarrow \text{Open}(\text{Tag}_{[F]}([\vec{a}[i]])) \qquad (3)$$

Figure 4:
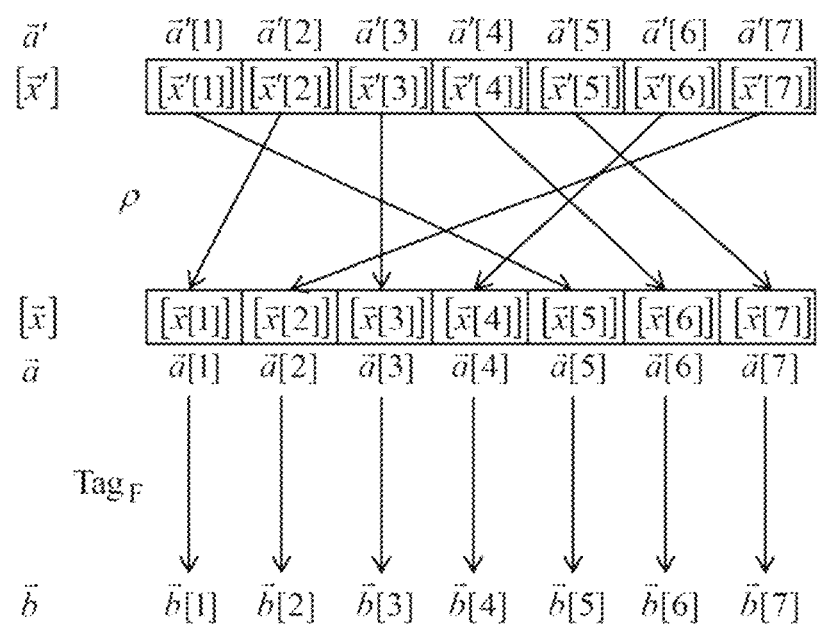
FIG. 4 is a diagram illustrating data generated by a refresh unit.

FIG. 4 exemplifies data generated by the refresh unit 11. The array of concealed values $[x'^{\rightarrow}]$ and the array of addresses $a'^{\rightarrow}$ before permutation are each rearranged by the same permutation $\rho$, generating the permuted array of concealed values $[x^{\rightarrow}]$ and the permuted array of addresses $a^{\rightarrow}$. That is, they are each permutated so that the combination of a concealed value $[x'^{\rightarrow}[i]]$ and an address $a'^{\rightarrow}[i]$ is maintained. Then, from each element of the permuted array of addresses $a^{\rightarrow}$, a public tag that corresponds to the element in one-to-one is calculated by the function $\text{Tag}_F$ and an array of public tags $b^{\rightarrow}$ is generated. Note that the rearrangement of the array of addresses $a'^{\rightarrow}$ is preferably performed with secure computation after once being concealed as mentioned above in consideration of security.

Figure 5:
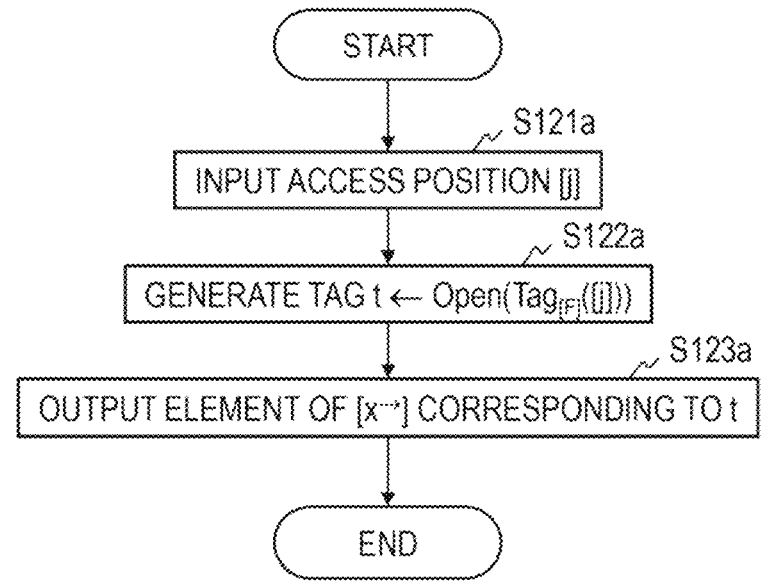
FIG. 5 is a diagram illustrating a processing procedure in the secure array access method that is performed at the time of reading.

In step S12a, the access unit 12 takes the concealed value [j] representing the access position j as input, and reads and outputs the elements of the array of concealed values $[x^{\rightarrow}]$ corresponding to the access position j. In the following, the operation of the access unit 12 during reading is described in more detail with reference to FIG. 5.

In step S121a, the access unit 12 receives the concealed value [j] representing the access position j as input.

In step S122a, the access unit 12 calculates a function $\text{Tag}_{[F]}([j])$ for the concealed value [j] representing the access position j using the concealed value [F] representing the parameter F, and reconstructs the calculation result to obtain a tag t. That is, the access unit 12 calculates Formula (4).

$$t \leftarrow \text{Open}(\text{Tag}_{[F]}([j])) \qquad (4)$$

In step S123a, the access unit 12 reads and outputs the value of an element $[x^{\rightarrow}[d]]$ of the array of concealed values $[x^{\rightarrow}]$ corresponding to the tag t. Note that "corresponding to the tag t" means making a pair with an address $a^{\rightarrow}[d]$ for which a public tag $b^{\rightarrow}[d]$ that matches the tag t in the array of public tags has been generated.

Figure 6:
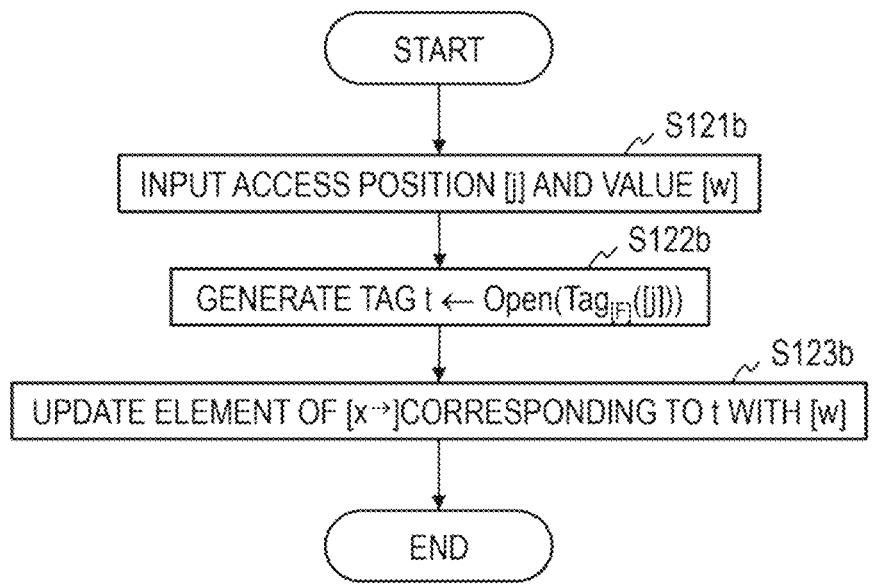
FIG. 6 is a diagram illustrating a processing procedure in the secure array access method that is performed at the time of writing.

In step S12b, the access unit 12 takes the concealed value [j] representing the access position j and the concealed value [w] representing the value w to be written as input, and rewrites an element of the array of concealed values $[x^{\rightarrow}]$ corresponding to the access position j with the value [w] to be written. In the following, the operation of the access unit 12 during writing is described in more detail with reference to FIG. 6.

In step S121b, the access unit 12 receives, as input, the concealed value [j] representing the access position j and the concealed value [w] representing the value w to be written.

In step S122b, the access unit 12 calculates the function $\text{Tag}_{[F]}([j])$ for the concealed value [j] representing the access position j using the concealed value [F] representing the parameter F, and reconstructs the calculation result to obtain the tag t. That is, the access unit 12 calculates the Formula (4) above.

In step S123b, the access unit 12 updates the value of the element $[x^{\rightarrow}[d]]$ of the array of concealed values $[x^{\rightarrow}]$ corresponding to the tag t with the value [w] to be written.

Second Embodiment

The secure array access apparatus 1 in the first embodiment is configured to generate a parameter necessary for execution of the refresh unit 11 as need arises. In a second embodiment, ones of parameters to be used by the refresh unit 11 that can be generated in advance are generated and stored beforehand. Use of the pre-calculated parameters can accelerate the operation of the refresh unit 11.

Figure 7:
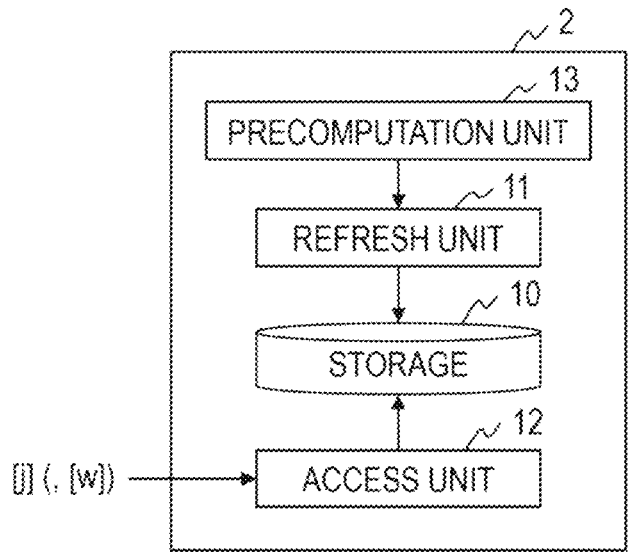
FIG. 7 is a diagram illustrating a functional configuration of a secure array access apparatus according to a second embodiment.
Figure 8:
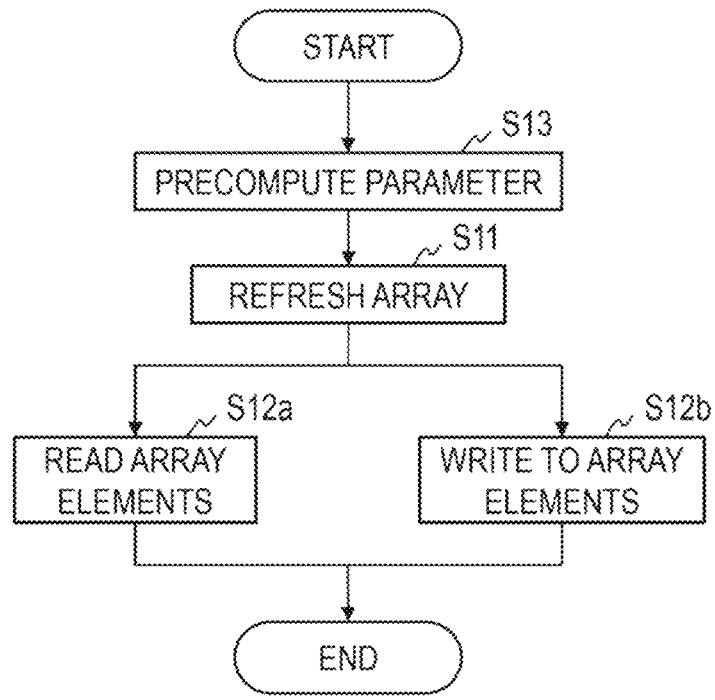
FIG. 8 is a diagram illustrating a processing procedure of the secure array access method according to the second embodiment.
Figure 9:
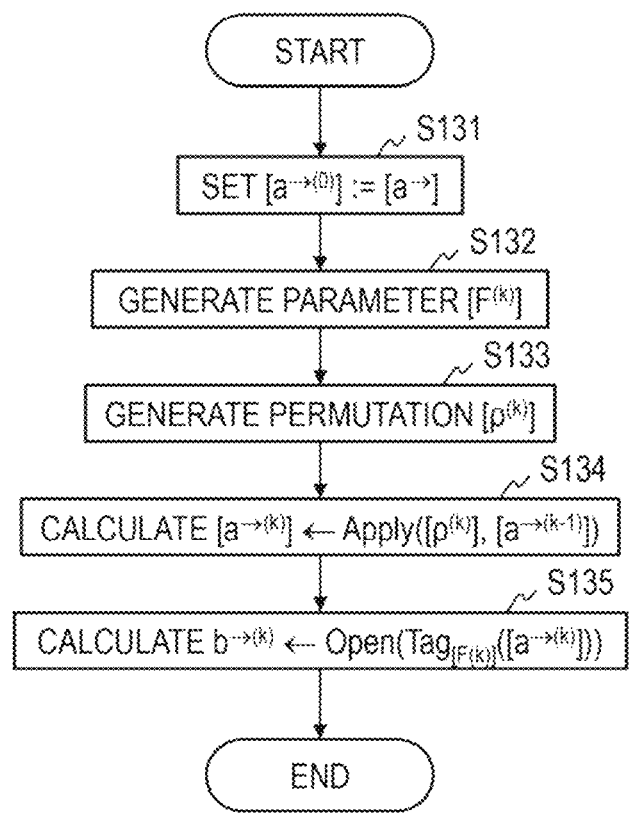
FIG. 9 is a diagram illustrating a processing procedure in the secure array access method that is performed at the time of precomputation.
Figure 10:
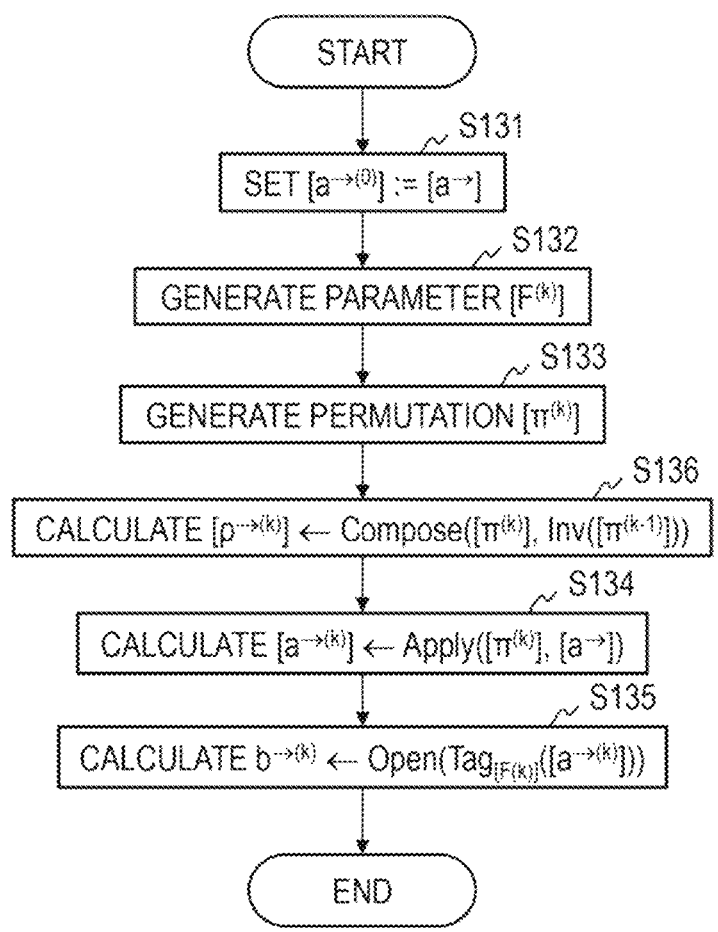
FIG. 10 is a diagram illustrating a processing procedure in the secure array access method that is performed at the time of precomputation.

A secure array access apparatus 2 according to the second embodiment includes a precomputation unit 13 in addition to the storage 10, the refresh unit 11, and the access unit 12 from the first embodiment as illustrated in FIG. 7. By the secure array access apparatus 2 performing processing at each of the steps illustrated in FIG. 8, a secure array access method in the second embodiment is implemented.

In step S13, the precomputation unit 13 first sets an array of addresses $\vec{a'}$ stored in the storage 10 as the 0th array of addresses $\vec{a}^{(0)}$. Then, it performs the following calculations for each integer k from 1 to m inclusive. Here, m is a predetermined natural number, m is arbitrarily set in accordance with an assumed number of accesses to an array and frequency of performing refresh.

Firstly, the precomputation unit 13 generates a concealed value $[F^{(k)}]$ representing the k-th random parameter $F^{(k)}$. Secondly, the precomputation unit 13 generates a concealed value $[\rho^{(k)}]$ representing the k-th random permutation $\rho^{(k)}$. Thirdly, the precomputation unit 13 generates the k-th array of addresses $\vec{a}^{(k)}$ by rearranging the array of addresses $\vec{a'}$ so as to correspond to the k-th permutation $[\rho^{(k)}]$. Finally, the precomputation unit 13 calculates the k-th array of public tags $\vec{b}^{(k)}$ calculated from the respective elements of the k-th array of addresses $\vec{a}^{(k)}$. That is, the precomputation unit 13 calculates Formula (5) in the k-th execution for each integer i from 1 to n inclusive.

$$\vec{b}^{(k)}[i] \leftarrow \mathrm{Open}(\mathrm{Tag}_{[F^{(k)}]}([\vec{a}^{(k)}[i]])) \qquad (5)$$

The array of addresses $\vec{a}^{(k)}$ is specifically calculated by permutating the (k–1)-th array of addresses $\vec{a}^{(k-1)}$ with the k-th permutation $[\rho^{(k)}]$. That is, the array of addresses $\vec{a}^{(k)}$ is calculated by Formula (6).

$$[\vec{a}^{(k)}] \leftarrow \mathrm{Apply}([\rho^{(k)}], [\vec{a}^{(k-1)}]) \qquad (6)$$

The array of addresses $\vec{a}^{(k)}$ may instead be calculated as follows. First, a concealed value $[\pi^{(k)}]$ representing the k-th random permutation $\pi^{(k)}$ is generated. Next, an inverse permutation $\mathrm{Inv}([\pi^{(k-1)}])$ of the (k–1)-th permutation $[\pi^{(k-1)}]$ is composed with the k-th permutation $[\pi^{(k)}]$ to calculate the k-th permutation $[\rho^{(k)}]$. That is, the permutation $[\rho^{(k)}]$ is calculated by Formula (7).

$$[\rho^{(k)}] \leftarrow \mathrm{Compose}([\pi^{(k)}], \mathrm{Inv}([\pi^{(k-1)}])) \qquad (7)$$

Then, the 0th array of addresses $\vec{a}^{(0)}$ is permuted with the permutation $[\pi^{(k)}]$ to calculate the array of addresses $\vec{a}^{(k)}$. That is, the array of addresses $\vec{a}^{(k)}$ is calculated by Formula (8).

$$[\vec{a}^{(k)}] \leftarrow \mathrm{Apply}([\pi^{(k)}], [\vec{a}^{(0)}]) \qquad (8)$$

The latter procedure can calculate multiple arrays of addresses $\vec{a}^{(k)}$ in parallel because it does not require the (k–1)-th array of addresses $\vec{a}^{(k-1)}$ when calculating the k-th array of addresses $\vec{a}^{(k)}$. Accordingly, processing by the precomputation unit 13 can be performed at higher speed.

In step S11, the refresh unit 11 performs the following calculations in the k-th execution. Firstly, the refresh unit 11 sets the k-th parameter $[F^{(k)}]$ as the parameter $[F]$ of the function $\mathrm{Tag}_{[F]}$. Secondly, the refresh unit 11 sets the k-th array of public tags $\vec{b}^{(k)}$ as an array of public tags $\vec{b}$. Finally, the refresh unit 11 determines an array of concealed values $[\vec{x}]$ by permuting the array of concealed values $[\vec{x'}]$ with the k-th permutation $[\rho^{(k)}]$. That is, the refresh unit 11 calculates Formula (9).

$$[\vec{x}] \leftarrow \mathrm{Apply}([\rho^{(k)}], [\vec{x'}]) \qquad (9)$$

Third Embodiment

In the first and second embodiments, accesses to the same access position will reference the same tag from when the previous refresh has been performed to when the next refresh is performed. Thus, the access position may become easier to estimate if a certain access position is accessed multiple times. A third embodiment makes the access position more difficult to estimate to improve security by referencing different tags even in accesses to the same access position.

In the third embodiment, the function $\mathrm{Tag}_F$ is AES-128 and F is an encryption key. N and T are natural numbers, where n=N+T holds. An array of addresses $\vec{a}$ is defined as $\vec{a}[i]=i$ ($i \in [1, n]$) and the access position j is defined as $j \in [1, N]$.

The precomputation unit 13 in the third embodiment executes the process described in the second embodiment for each $k \in [1, k]$ with m being a sufficiently large natural number.

The refresh unit 11 in the third embodiment executes the process described in the second embodiment. The refresh unit 11 in the third embodiment further initializes a set S for storing accessed tags to an empty set.

The access unit 12 in the third embodiment performs reading or writing from/to the array of concealed values $[\vec{x}]$ as follows. Firstly, the access unit 12 calculates a function $\mathrm{Tag}_{[F]}([j])$ for the concealed value [j] representing the access position j using the concealed value [F] representing the parameter F, and obtain a concealed value [t] of the tag t. That is, the access unit 12 calculates Formula (10).

$$[t] \leftarrow \mathrm{Tag}_{[F]}([j]) \qquad (10)$$

Secondly, the access unit 12 calculates a function $\mathrm{Tag}_{[F]}(N+|S|)$ for N+|S| using the concealed value [F] representing the parameter F, and obtain a concealed value [s] of a tag s. That is, the access unit 12 calculates Formula (11).

$$[s] \leftarrow \mathrm{Tag}_{[F]}(N+|S|) \qquad (11)$$

Thirdly, the access unit 12 calculates a concealed value [c] of a boolean value c which takes c=1 if $t \in S$ and c=0 otherwise. For example, the access unit 12 calculates Formula (12) for each $t' \in S$ with $c \leftarrow 0$.

$$[c] \leftarrow [c] + EQ([t], t') \qquad (12)$$

Fourthly, the access unit 12 selects the tag s if c=1 and the tag t if c=0, and obtains a tag p reconstructed the result of selection. That is, the access unit 12 calculates Formula (13).

$$p \leftarrow \mathrm{Open}(\mathrm{IfElse}([c], [s], [t])) \qquad (13)$$

Fifthly, the access unit 12 calculates $S \leftarrow S \cup \{p\}$ and adds the tag p to the set S.

When performing a read, the access unit 12 calculates a concealed value [r] of the value of an element for which the public tag matches the tag t from among the elements of the array of concealed values $[\vec{x}]$ that have public tags included in the set S. For example, the access unit 12 calculates Formula (14) with $[r] \leftarrow 0$ for each $t' \in S$, where i is a number with $\vec{b}[i]=t'$.

$$[r] \leftarrow [r] + EQ([t], t') \times [\vec{x}[i]] \qquad (14)$$

When performing a write, the access unit 12 rewrites the value of an element for which the public tag matches the tag t from among the elements of the array of concealed values $[x^\to]$ that have public tags included in the set S, with the concealed value [w] of the value to be written. For example, the access unit 12 calculates Formula (15) for each t'∈S, where i is a number with $b^\to[i]=t'$.

$$[\vec{x}[i]] \leftarrow \text{IfElse}(EQ([t],t'),[w],[\vec{x}[i]]) \quad (15)$$

Finally, if |S|≥T, the access unit 12 initializes the set S to an empty set and executes the refresh unit 11.

With the configuration of the third embodiment, reading and writing with addresses keeping concealed can be implemented with O(1) of communication rounds. Due to the small communication rounds, serial reading and writing can be efficiently implemented.

The secure array access apparatuses and methods of the respective embodiments prevent leakage of information on the order of the elements in an array even when tags generated from the elements of the array are published because the array of concealed values is shuffled in advance via random permutation. Search for a published tag can be performed in plaintext, and if an approach with constant rounds such as AES is employed in tag calculations, does not involve recursive processing for tag calculation or search for an element corresponding to a tag. Accordingly, a constant number of communication rounds can be achieved in the aggregate as well. Conventional techniques involve recursive processing in calculation of element positions because element positions are directly calculated without publication of tags. As a result, more communication rounds than a constant are required.

While the embodiments of the present invention have been described, specific configurations are not limited to these embodiments, but design modifications and the like within a range not departing from the spirit of the invention are encompassed in the scope of the invention, of course. The various processes described in the embodiments may be executed in parallel or separately depending on the processing ability of an apparatus executing the process or on any necessity, rather than being executed in time series in accordance with the described order.

[Program and Recording Medium]

When various types of processing functions in the apparatuses described in the above embodiments are implemented on a computer, the contents of processing function to be contained in each apparatus is written by a program. With this program executed on the computer, various types of processing functions in the above-described apparatuses are implemented on the computer.

This program in which the contents of processing are written can be recorded in a computer-readable recording medium. The computer-readable recording medium may be any medium such as a magnetic recording device, an optical disk, a magneto-optical recording medium, and a semiconductor memory.

Distribution of this program is implemented by sales, transfer, rental, and other transactions of a portable recording medium such as a DVD and a CD-ROM on which the program is recorded, for example. Furthermore, this program may be stored in a storage unit of a server computer and transferred from the server computer to other computers via a network so as to be distributed.

A computer which executes such program first stores the program recorded in a portable recording medium or transferred from a server computer once in a storage unit thereof, for example. When the processing is performed, the computer reads out the program stored in the storage unit thereof and performs processing in accordance with the program thus read out. As another execution form of this program, the computer may directly read out the program from a portable recording medium and perform processing in accordance with the program. Furthermore, each time the program is transferred to the computer from the server computer, the computer may sequentially perform processing in accordance with the received program. Alternatively, a configuration may be adopted in which the transfer of a program to the computer from the server computer is not performed and the above-described processing is executed by so-called application service provider (ASP)-type service by which the processing functions are implemented only by an instruction for execution thereof and result acquisition. It should be noted that a program in this form includes information which is provided for processing performed by electronic calculation equipment and which is equivalent to a program (such as data which is not a direct instruction to the computer but has a property specifying the processing performed by the computer).

In this form, the present apparatus is configured with a predetermined program executed on a computer. However, the present apparatus may be configured with at least part of these processing contents realized in a hardware manner.

What is claimed is:

1. A method of secure array access performed by a secure array access apparatus, the method comprising:
   a step of generating concealed values of an array comprising using an array of concealed values $[x'^\to]$ and an array of addresses $a'^\to$ stored in a storage of the secure array access apparatus to generate concealed values $[x^\to]=([x^\to[1]], [x^\to[2]], \ldots, [x^\to[n]])$ of an array $x^\to=(x^\to[1], x^\to[2], \ldots, x^\to[n])$, the array $x^\to$ being generated by permutating a plaintext $x'^\to$ of the array of concealed values $[x'^\to]$, and an array of public tags $b^\to=(b^\to[1], b^\to[2], \ldots, b^\to[n])$ that correspond in one-to-one to respective elements of a permuted array of addresses $a^\to$, where an array of addresses corresponding to the respective elements of the permuted array of concealed values $[x^\to]$ is $a^\to=(a^\to[1], a^\to[2], \ldots, a^\to[n])$, wherein the step of generating the concealed values of an array comprises:
   generating a concealed value [ρ] that represents a random permutation ρ;
   concealing the respective elements of the array of addresses $a'^\to$ stored in the storage to obtain an array of concealed values of addresses $[a'^\to]$
   applying the permutation [ρ] to the array of concealed values $[x'^\to]$ stored in the storage to obtain a permuted array of concealed values $[x^\to]$;
   applying the permutation [ρ] to the array of concealed values of addresses $[a'^\to]$ to obtain a permuted array of concealed values of addresses $[a^\to]$;
   calculating a function $\text{Tag}_{[F]}([a^\to])$ for the permuted array of concealed values of addresses $[a^\to]$ using a concealed value [F] representing a random parameter F, and reconstructing the calculation result to obtain an array of public tags $b^\to=(b^{\to[1]}, b^{\to[2]}, \ldots, b^{\to[n]})$,
   wherein the function Tag [F] is a function representing an injection from an address to a tag with the operation of the function Tag [F] being controlled by the concealed value [F] representing the parameter F;
   a step of reading comprising taking a concealed value [j] of the concealed values $[x^\to]$ representing an access position j as input, and reading and outputting elements of the array of concealed values [$\vec{x}$] corresponding to the access position j;

a step of writing comprising taking the concealed value [j] of the concealed values [$\vec{x}$] representing the access position j and a concealed value [w] representing a value w to be written as an input, and rewriting an element of the array of concealed values [$\vec{x}$] corresponding to the access position j with the concealed value [w]; and perform a cryptographic function using said element of the array of concealed values [$\vec{x}$].

2. The method of claim 1, wherein the step of reading comprises, for each concealed value [j] of the concealed values [$\vec{x}$], receiving the concealed value [j] representing the access position j as an input, calculating a corresponding function $\text{Tag}_{[F]}([j])$ representing a corresponding access position using the concealed value [F] representing the parameter F, and reconstructing the calculation result to obtain a tag t; and reading and outputting a value of an element [$\vec{x}^{[d]}$] of the array of concealed values [$\vec{x}$] corresponding to the tag t.

3. The method of claim 1, wherein the step of reading comprises, for each concealed value [i] of the concealed values [$\vec{x}$], receiving the concealed value [j] representing the access position j and the concealed value [w], calculating the function $\text{Tag}_{[F]}([j])$ for the concealed value [j] representing the access position j using the concealed value [F] representing the parameter F, and reconstructing the calculation result to obtain the tag t, and updating the value of the element [$\vec{x}$[d]] of the array of concealed values [$\vec{x}$] corresponding to the tag t with the value [w].

4. A non-transitory computer product containing instructions for a method of secure array access to be performed by a secure array access apparatus, the method comprising:

a step of generating concealed values of an array comprising using an array of concealed values [$\vec{x}'$] and an array of addresses $\vec{a}'$ stored in a storage of the secure array access apparatus to generate concealed values [$\vec{x}$]=([$\vec{x}$[1]], [$\vec{x}$[2]], . . . , [$\vec{x}$[n]]) of an array $\vec{x}$=($\vec{x}$[1], $\vec{x}$[2], . . . , $\vec{x}$[n]), the array $\vec{x}$ being generated by permutating a plaintext $\vec{x}'$ of the array of concealed values [$\vec{x}'$], and an array of public tags $\vec{b}'$=($\vec{b}'$[1], $\vec{b}'$[2], . . . , $\vec{b}'$[n]) that correspond in one-to-one to respective elements of a permuted array of addresses $\vec{a}$, where an array of addresses corresponding to the respective elements of the permuted array of concealed values [$\vec{x}$] is $\vec{a}$=($\vec{a}$[1], $\vec{a}$[2], . . . , $\vec{a}$[n]), wherein the step of generating the concealed values of an array comprises:

generating a concealed value [ρ] that represents a random permutation ρ;

concealing the respective elements of the array of addresses $\vec{a}'$ stored in the storage to obtain an array of concealed values of addresses [$\vec{a}'$]

applying the permutation [ρ] to the array of concealed values [$\vec{x}'$] stored in the storage to obtain a permuted array of concealed values [$\vec{x}$];

applying the permutation [ρ] to the array of concealed values of addresses [$\vec{a}'$] to obtain a permuted array of concealed values of addresses [$\vec{a}$];

calculating a function $\text{Tag}_{[F]}([\vec{a}])$ for the permuted array of concealed values of addresses [$\vec{a}$] using a concealed value [F] representing a random parameter F, and reconstructing the calculation result to obtain an array of public tags $\vec{b}$=($\vec{b}$[1], $\vec{b}$[2], . . . , $\vec{b}$[n]), wherein the function Tag [F] is a function representing an injection from an address to a tag with the operation of the function Tag [F] being controlled by the concealed value [F] representing the parameter F;

a step of reading comprising taking a concealed value [j] of the concealed values [$\vec{x}$] representing an access position j as input, and reading and outputting elements of the array of concealed values [$\vec{x}$] corresponding to the access position j;

a step of writing comprising taking the concealed value [j] of the concealed values [$\vec{x}$] representing the access position j and a concealed value [w] representing a value w to be written as an input, and rewriting an element of the array of concealed values [$\vec{x}$] corresponding to the access position j with the concealed value [w]; and perform a cryptographic function using said element of the array of concealed values [$\vec{x}$].

5. A secure array access apparatus comprising processing circuitry that is configured to:

perform a step of generating concealed values of an array comprising using an array of concealed values [$\vec{x}'$] and an array of addresses $\vec{a}'$ stored in a storage of the secure array access apparatus to generate concealed values [$\vec{x}$]=([$\vec{x}$[1]], [$\vec{x}$[2]], . . . , [$\vec{x}$[n]]) of an array $\vec{x}$=($\vec{x}$[1], $\vec{x}$[2], . . . , $\vec{x}$[n]), the array $\vec{x}$ being generated by permutating a plaintext $\vec{x}'$ of the array of concealed values [$\vec{x}'$], and an array of public tags $\vec{b}'$=($\vec{b}'$[1], $\vec{b}'$[2], . . . , $\vec{b}'$[n]) that correspond in one-to-one to respective elements of a permuted array of addresses $\vec{a}$, where an array of addresses corresponding to the respective elements of the permuted array of concealed values [$\vec{x}$] is $\vec{a}$=($\vec{a}$[1], $\vec{a}$[2], . . . , $\vec{a}$[n]), wherein the step of generating the concealed values of an array comprises:

generate a concealed value [ρ] that represents a random permutation p;

conceal the respective elements of the array of addresses $\vec{a}'$ stored in the storage to obtain an array of concealed values of addresses [$\vec{a}'$]

apply the permutation [ρ] to the array of concealed values [$\vec{x}'$] stored in the storage to obtain a permuted array of concealed values [$\vec{x}$];

apply the permutation [ρ] to the array of concealed values of addresses [$\vec{a}'$] to obtain a permuted array of concealed values of addresses [$\vec{a}$];

calculate a function $\text{Tag}_{[F]}([\vec{a}])$ for the permuted array of concealed values of addresses [$\vec{a}$] using a concealed value [F] representing a random parameter F, and reconstructing the calculation result to obtain an array of public tags $\vec{b}$=($\vec{b}$[1], $\vec{b}$[2], . . . , $\vec{b}$[n]), wherein the function Tag [F] is a function representing an injection from an address to a tag with the operation of the function Tag [F] being controlled by the concealed value [F] representing the parameter F;

perform a step of reading comprising taking a concealed value [j] of the concealed values [$\vec{x}$] representing an access position j as input, and reading and outputting elements of the array of concealed values [$\vec{x}$] corresponding to the access position j;

perform a step of writing comprising taking the concealed value [j] of the concealed values [$\vec{x}$] representing the access position j and a concealed value [w] representing a value w to be written as an input, and rewriting an element of the array of concealed values [$\vec{x}$] corresponding to the access position j with the concealed value [w]; and perform a cryptographic function using said element of the array of concealed values $[\vec{x}]$.

6. The secure array access apparatus of claim 5, wherein the step of reading comprises, for each concealed value $[j]$ of the concealed values $[\vec{x}]$, receiving the concealed value $[j]$ representing the access position j as an input, calculating a corresponding function $\text{Tag}_{[F]}([j])$ representing a corresponding access position using the concealed value $[F]$ representing the parameter F, and reconstructing the calculation result to obtain a tag t; and reading and outputting a value of an element $[\vec{x}[d]]$ of the array of concealed values $[\vec{x}]$ corresponding to the tag t.

7. The secure array access apparatus of claim 5, wherein the step of reading comprises, for each concealed value $[j]$ of the concealed values $[\vec{x}]$, receiving the concealed value $[j]$ representing the access position j and the concealed value $[w]$, calculating the function $\text{Tag}_{[F]}([j])$ for the concealed value $[j]$ representing the access position j using the concealed value $[F]$ representing the parameter F, and reconstructing the calculation result to obtain the tag t, and updating the value of the element $[\vec{x}[d]]$ of the array of concealed values $[\vec{x}]$ corresponding to the tag t with the value $[w]$.

8. The secure array access apparatus of claim 5, wherein the processing circuitry is further configured to:

set the array of addresses $\vec{a}'$ as a 0th array of addresses $\vec{a}^{(0)}$, and for each integer k from 1 to m inclusive, where m is a natural number, calculate a random parameter $[F^{(k)}]$ of the function Tag, a random permutation $[\rho^{(k)}]$, a concealed value $[\vec{a}^{(k)}]$ of an array of addresses $\vec{a}^{(k)}$ generated by rearranging the array of addresses $\vec{a}'$ so as to correspond to the permutation $[\rho^{(k)}]$, and an array of public tags $\vec{b}^{(k)}$ calculated from respective elements of the concealed value $[\vec{a}^{(k)}]$ of the array of addresses $\vec{a}^{(k)}$ with the function Tag which uses the parameter $[F^{(k)}]$, and in a k-th execution, set the parameter $[F^{(k)}]$ as the parameter $[F]$ of the function Tag, sets the array of public tags $\vec{b}^{(k)}$ as the array of public tags $\vec{b}$, and determine the array of concealed values $[\vec{x}]$ by permutating the array of concealed values $[\vec{x}']$ with the permutation $[\rho^{(k)}]$.

9. The secure array access apparatus of claim 8, wherein the processing circuitry is further configured to calculate a k-th array of addresses $\vec{a}^{(k)}$ by permutating a k−1th array of addresses $\vec{a}^{(k-1)}$ with a k-th permutation $[\rho^{(k)}]$.

10. The secure array access apparatus of claim 8, wherein the processing circuitry is further configured to calculate the permutation $[\rho^{(k)}]$ by generating a k-th random permutation $[\pi^{(k)}]$ and composing an inverse permutation $\text{Inv}([\pi^{(k-1)}])$ of a k−1th permutation $[\pi^{(k-1)}]$ and the k-th permutation $[\pi^{(k)}]$, and calculate a k-th array of addresses $\vec{a}^{(k)}$ by permutating the array of addresses $\vec{a}^{(0)}$ with the k-th permutation $[\pi^{(k)}]$.

* * * * *

UNITED STATES PATENT AND TRADEMARK OFFICE
CERTIFICATE OF CORRECTION

PATENT NO. : 12,164,440 B2
APPLICATION NO. : 17/414318
DATED : December 10, 2024
INVENTOR(S) : Koki Hamada et al.

Page 1 of 1

It is certified that error appears in the above-identified patent and that said Letters Patent is hereby corrected as shown below:

In the Claims

Claim 3, Column 11, Line 25, "for each concealed value [i] of the concealed" should read -- for each concealed value [j] of the concealed --

Signed and Sealed this
Twenty-second Day of April, 2025

Coke Morgan Stewart
*Acting Director of the United States Patent and Trademark Office*